(12) United States Patent
Sotriffer et al.

(10) Patent No.: US 10,320,584 B2
(45) Date of Patent: Jun. 11, 2019

(54) DEVICE ACCESS BY MEANS OF A GENERIC COMMUNICATION DRIVER

(71) Applicant: Endress+Hauser Process Solutions AG, Reinach (CH)

(72) Inventors: Ingomar Sotriffer, Efringen-Kirchen (DE); Werner Luber, Allschwit (DE); Michael Mayer, Oberwil (CH)

(73) Assignee: Endress+Hauser Process Solutions AG, Reinach (CH)

( * ) Notice: Subject to any disclaimer, the term of this patent is extended or adjusted under 35 U.S.C. 154(b) by 0 days.

(21) Appl. No.: 15/546,095

(22) PCT Filed: Dec. 7, 2015

(86) PCT No.: PCT/EP2015/078813
§ 371 (c)(1),
(2) Date: Jul. 25, 2017

(87) PCT Pub. No.: WO2016/119956
PCT Pub. Date: Aug. 4, 2016

(65) Prior Publication Data
US 2018/0013582 A1      Jan. 11, 2018

(30) Foreign Application Priority Data
Jan. 26, 2015   (DE) .................. 10 2015 101 057

(51) Int. Cl.
*H04L 12/46*    (2006.01)
*H04L 12/40*    (2006.01)
*H04L 12/721*   (2013.01)

(52) U.S. Cl.
CPC .... *H04L 12/4625* (2013.01); *H04L 12/40169* (2013.01); *H04L 45/566* (2013.01)

(58) Field of Classification Search
CPC ........... H04L 12/4625; H04L 12/40169; H04L 45/566
See application file for complete search history.

(56) References Cited

U.S. PATENT DOCUMENTS

2008/0273486 A1\*  11/2008  Pratt ................... H04L 12/403
                                                                370/328

FOREIGN PATENT DOCUMENTS

DE        102012200282 A1     6/2013

OTHER PUBLICATIONS

FDT-JIG Working Group, FDT-Joint Interest Group Guideline: FDT Interface Specification Version 1.21, Mar. 2005, 385 pp. (Year: 2005).\*

(Continued)

*Primary Examiner* — Siming Liu
(74) *Attorney, Agent, or Firm* — Mark A. Logan; PatServe

(57) ABSTRACT

The application relates to a data transmission system for a data exchange between a field bus system that includes at least one field device and device access software installed on a host. The data transmission system includes a coupler device connected to the field bus system and a generic communication driver integrated in the device access software. The data transmission system further includes a central data transmission path between the generic communication driver and the coupler device. The generic communication driver is configured to exchange data with device drivers integrated in the device access software and to transmit data received from the device drivers to the coupler device, and to forward data received from the coupler device to the respective device driver. The coupler (Continued)

device is configured to convert data traffic from a first format to a second format and from the second format to the first format.

11 Claims, 10 Drawing Sheets

(56) References Cited

OTHER PUBLICATIONS

Search Report for German Patent Application No. 10 2015 101 057.7, German Patent Office, dated Oct. 28, 2015, 5 pp.
Search Report for International Patent Application No. PCT/EP2015/078813, WIPO, dated May 25, 2016, 17 pp.
FDT-JIG Working Group, FDT-Joint Interest Group Guideline: FDT Interface Specification Version 1.21, Mar. 2005, 385 pp.

* cited by examiner

DEVICE ACCESS BY MEANS OF A GENERIC COMMUNICATION DRIVER

CROSS-REFERENCE TO RELATED APPLICATIONS

The present application is related to and claims the priority benefit of German Patent Application No. 10 2015 101 057.7, filed on Jan. 26, 2015 and International Patent Application No. PCT/EP2015/078813, filed Dec. 7, 2015, the entire contents of which are incorporated herein by reference.

TECHNICAL FIELD

The invention relates to a data transmission system for a data exchange between a field bus system and device access software, a coupler device for a field bus system, a generic communications driver for device access software, as well as a data format converter for device access software. Furthermore, the invention relates to a method for data exchange between a field bus system and device access software, as well as a method for establishing communications paths between a field bus system and device access software.

BACKGROUND

Multiple field devices serving to detect and/or influence process variables are used in automation technology. Examples of field devices of this type are fill state measurement devices, mass flow meters, pressure and temperature measurement devices, etc., which, as sensors, record the corresponding process variables, fill-level, flow rate, pressure, and temperature.

The parameterization, configuration, and state monitoring of the field devices of a field bus system normally take place by means of device access software installed on a host. In typical device access software, the hierarchical structure of the field bus system is simulated with the aid of device drivers or device description files. The arrangement of the device drivers or device description files corresponds, mirror-inverted, to the structure of the device access software. However, this also entails disadvantages. For example, if a device driver or a device description file for a gateway is absent or incorrect, all field devices that can be reached via this gateway may then no longer be accessed.

SUMMARY

Therefore, it is an aim of the invention to provide a less failure-prone structure for the device access software of a field bus system.

Advantageous developments of the invention are specified in the dependent claims.

A data transmission system corresponding to the embodiments of the invention is designed for a data exchange between a field bus system that comprises at least one field device, and device access software that is installed on a host and with which components of the field bus system may be accessed. The data transmission system comprises a coupler device that is connected to the field bus system, as well as a generic coupler device that is integrated into the device access software, wherein at least one device driver is, moreover, integrated into the device access software. Moreover, the data transmission system comprises a central data transmission route that can be established between the generic communications driver and the coupler device and via which primary data traffic can be transferred.

The generic communications driver is designed to exchange data with at least one device driver integrated into the device access software and to transmit data received from the at least one device driver to the coupler device as part of the primary data traffic via the central data transmission route, and to relay data of the primary data traffic received from the coupler device via the central data transmission route to those respective device drivers for which the data is intended.

The coupler device is designed to convert the primary data traffic received from the generic communications driver via the central data transmission route into secondary data traffic, with the addition of routing information, and to send said secondary traffic data to the field bus system, and to convert data received from at least one of the field devices into the primary data traffic and to transmit said primary data traffic to the generic communications driver via the central data transmission route.

A novel topology for data exchange between a field bus system and device access software is used in the data transmission system corresponding to the embodiments of the present invention. A central communications component—the generic communications driver—is provided on the device access software side, and a central communications component—the coupler device—is likewise provided on the field bus system side. Between the generic communications driver and the coupler device, a central data transmission route is established via which the entire data exchange between the device access software and the field bus system is handled. The generic communications driver is, moreover, responsible for handling the data exchange with the device drivers within the device access software. Within the field bus system, the coupler device is responsible for routing of the data traffic to the desired destination. For this, the coupler device generates suitable routing information that is inserted into the data traffic. This routing information generated by the coupler device provides for the correct routing of the data traffic to the desired destination within the field bus system.

With the hierarchical arrangement of the communications and device drivers that was previously used within the device access software, the absence of a driver would have already resulted in the failure of entire sub-segments of the driver structure. With the novel, centralized driver structure, this may no longer occur, because all device drivers communicate directly with the generic communications driver. Additional communications drivers are unnecessary. The entire system is thereby markedly less susceptible to failure. It is no longer possible for a missing driver to paralyze entire portions of the device access software. This is especially advantageous for extensively interconnected field bus topologies.

In the present data transmission system, all intelligence and computing power that are required for data transmission, protocol conversion, and routing are accommodated in two communications components that are provided for this—in the generic communications driver and the associated coupler device. The coupler device, especially, is thereby responsible for routing within the field bus system. Due to this bundling and centralization of the functionalities, the system is more transparent and less failure-prone overall.

An additional advantage is that the arriving data traffic is monitored on the part of the coupler device, and a security check may be performed. The handling of the data exchange via two central communications components is in this respect also reasonable from a security aspect.

BRIEF DESCRIPTION OF THE DRAWINGS

In the following, the invention is outlined in more detail with the aid of exemplary embodiments depicted in the drawings. The figures show:

In FIG. 1, a field bus system 100 is shown that comprises multiple, hierarchically-arranged field bus segments. The field bus segment 101 is realized according to the Profibus protocol. A field access device 102, a field device 103, and a gateway 104 are connected to the field bus segment 101. The HART protocol is used below the gateway 104. The two field devices 105, 106 that are connected to the gateway 104 especially communicate with said gateway 104 via the HART protocol. The gateway 104 is designed to convert Profibus packets that are received from the field bus segment 101 into corresponding HART packets, and to convert HART packets, received in the reverse direction from the field devices 105, 106, into corresponding Profibus packets.

Figure 1:
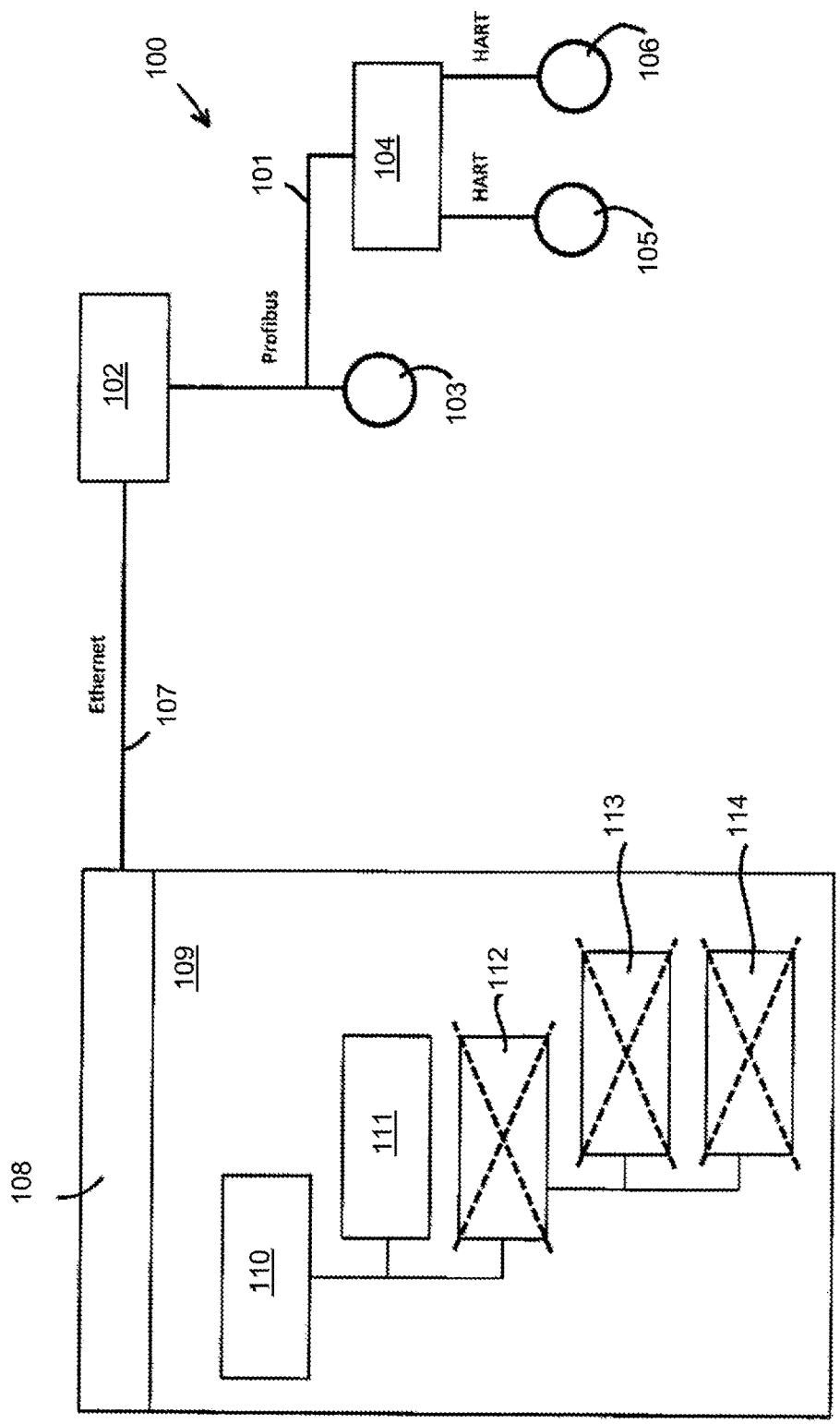
FIG. 1 shows a field bus system, as well as the structure of the device access software according to the prior art, wherein the consequences of the absence of a suitable gateway driver or gateway DTM (Device Type Manager) are illustrated.

A host 108 on which device access software 109 is installed is connected to the field access device 102 via an Ethernet connection 107. The components of the field bus system 100 are configured and parameterized from the host 108 via the device access software 109. The parameters of the various components of the field bus system 100 may, especially, be read out, presented, and modified from the device access software 109. Moreover, the device access software 109 enables a state monitoring (condition monitoring) of the components of the field bus system 100. The data exchange that is required for these tasks is normally handled via what is known as acyclical data traffic.

In order to be able to correctly address the various components of the field bus system 100, the device access software 109 requires information about the properties and parameters of the field devices, gateways, remote I/O's, etc., of the field bus system 100. This information is provided by the manufacturers of the different devices—normally in the form of device description files or device drivers. With the Profibus-DP, Profibus-PA, Fieldbus Foundation, and HART field bus protocols, device descriptions according to the DD (Device Description), EDD (Enhanced Device Description), DTM (Device Type Manager), and FDI Device Packages standards are used for device description for the acyclical data exchange. Especially with the EDD and DTM standards, graphical features and graphical user interfaces that should facilitate the parameterization and configuration of the respective field device are also specified, in addition to device parameters, device functionality, and address space assignment. In the EDD standard, special graphic commands that are executed in the manner of an interpreter language are provided for generating these graphical interfaces.

In the DTM (Device Type Manager) standard, an executable file (an executable) is provided that also comprises the cited graphical features. The various DTM's regarding the various components of the field bus system are integrated into a common FDT framework application, wherein FDT stands for "Field Device Tool." A common framework application is thereby provided into which the DTM's regarding various devices and from different manufacturers may be integrated.

In recent years, the FDT standard has been increasingly supplemented, and later replaced, by the FDI Device Packages standard.

In addition to the Profibus, Fieldbus Foundation, and HART field bus protocols that were discussed in the preceding, what are known as the Industrial Ethernet protocols have been gaining in importance, to which belong the EtherNet/IP, ProfiNet, and EtherCAT field bus protocols, among others.

In the EtherNet/IP field bus protocol, a device description file corresponding to the EDS (Electronic Data Sheet) standard is provided for description of both the cyclical and acyclical data exchange.

In the example of FIG. 1, the device access software 109 is an FDT framework application in which a number of different device DTM's, gateway DTM's, and communications DTM's are integrated for description of the field bus system 100. The communications DTM 110 stands at the uppermost position of the DTM hierarchy. The communications DTM 110 is associated with the field access device 102 and communicates with this via the Ethernet connection 107. The communications DTM 110 represents, in a certain manner, the external interface of the device access software 109. All incoming and outgoing data traffic is directed via the communications DTM 110.

In the DTM hierarchy, the device DTM 111 is arranged below the communications DTM 110 and reproduces the functionality of the field device 103. Since the field device 103 is a Profibus field device, the associated device DTM 111 is also designed to send and receive Profibus data packets. For data transmission to the field device 103, the device DTM 111 therefore sends a Profibus data packet to the communications DTM 110, which converts this data packet into an Ethernet data stream and transmits this to the field access device 102 via the Ethernet connection 107. There, the Ethernet data are converted back again into the original Profibus data packet, and this Profibus data packet is transmitted to the field device 103. The data transmission functions correspondingly in the reverse direction—thus, from the field device 103 to the associated device DTM 111.

In the level below the communications DTM 110, a gateway DTM 112 is, moreover, arranged that is associated with the gateway 104. The gateway 104 may be parameterized and configured via the gateway DTM 112. The communication between the gateway DRM 112 and the gateway 104 thereby takes place via Profibus data packets that, for the transmission between the communications DTM 110 and the field access device 102, are converted into a corresponding Ethernet data stream.

In the DTM hierarchy, two device DTM's 113, 114 are arranged below the gateway DTM 112. The device DTM 113 reproduces the functionality of the field device 105, and the device DTM 114 reproduces the functionality of the field device 106. Since the two field devices 105, 106 are HART field devices, the two device DTM's 113, 114 are also designed for the HART protocol.

For example, if the device DTM 113 wants to transmit data to the associated field device 105, it sends a HART data packet to the gateway DTM 112. The gateway DTM 112 simulates the functionality of the gateway 104 on the device access software 109 side. Since the gateway 104 acts as a protocol converter between Profibus and HART, the associated gateway DTM 112 also includes this protocol converter functionality. The gateway DTM 112 therefore converts the HART data packet received from the device DTM 113 into a corresponding Profibus data packet which is then transmitted to the communications DTM 110. The communications DTM 110 converts the Profibus packet into a corresponding Ethernet data stream that is transmitted via the Ethernet connection 107 to the field access device 102, and, there, is converted again into the original Profibus data packet. This Profibus data packet is supplied to the gateway 104. In the gateway 104, the Profibus data packet is converted into a corresponding HART data packet which is then supplied to the field device 105.

If a HART data packet is to be transmitted in the reverse direction, from the field device 105 to the device DTM 113, this HART data packet is then first converted by the gateway 104 into a Profibus data packet which is then converted by the field access device 102 into a corresponding Ethernet data stream, which is transmitted via the Ethernet connection 107 to the communications DTM 110. There, the Ethernet data are converted back again into the original Profibus data packet. This Profibus data packet is then converted by the gateway DTM 112 into a corresponding HART data packet that is supplied to the device DTM 113.

From the above depiction, the result in the solution shown in FIG. 1 is that the hierarchical structure of the field bus system 100 on the device access software 109 side is simulated—mirror-inverted—by a corresponding arrangement of communications DTM's, gateway DTM's, and device DTM's. The hierarchical topology of the DTM's corresponds one-to-one to the hierarchical topology of the real, physical field bus system. This hierarchical arrangement of the device descriptions is widespread and has established itself in the market. Nevertheless, it is striking that, for a relatively simple field bus system such as the field bus system 100 shown in FIG. 1, the associated hierarchical structure of the DTM's is already comparatively complex. For more expansive field bus systems, as they often occur in practice, a highly complicated, hierarchical structure with numerous interconnections, which are also designated as "Nested Communication," results for the DTM's.

DETAILED DESCRIPTION

A further disadvantage of the conventional hierarchical DTM structure shown in FIG. 1 is to be explained in the following. It is to be assumed that the gateway 104 originates from a third-party manufacturer, and that the third-party manufacturer provides no suitable gateway DTM 112 for the FDT framework application. The reason for this might, for example, be that the third-party manufacturer primarily focuses on the DD and EDD standards, and supports the alternative FDT/DTM standard only to a certain degree. It would also be conceivable that, for the operating system that is installed on the host 108, there is no matching gateway DTM for the gateway 104. Moreover, it would be conceivable that the gateway DTM 112 provided by the third-party manufacturer has programming errors, and, therefore, that a use should be avoided.

If no suitable gateway DTM 112 is available for the gateway 104, this then means that a parameterization, configuration, and state monitoring of the gateway 104 from the device access software 109 is not possible. Moreover, however, this also means that the two field devices 105, 106 that are connected to the gateway 104 cannot be accessed from the device access software 109, although a matching device DTM 113, 114 for each of the two field devices 105, 106 is present on the device access software 109 side. The reason for this is that the two device DTM's 113, 114 require the gateway 112 arranged above them for an access to the two field devices 105, 106. The gateway DTM 112 is required especially for the protocol conversion from HART to Profibus. If the gateway DTM 112 is absent, for all DTM's arranged below this in the DTM hierarchy, it is therefore also no longer possible to access the corresponding devices of the field bus system 100. Therefore, in addition to the gateway DTM 112, in FIG. 1, the two device DTM's 113, 114 that are arranged below this are also canceled.

This represents a severe disadvantage of the hierarchical DTM structure of the prior art that is shown in FIG. 1. If a gateway DTM is absent or fails, all DTM's arranged below this in the DTM hierarchy may thereby also no longer be used. A parameterization and configuration of the corresponding field devices is then not possible from the device access software 109. The absence or the omission of a gateway DTM that is arranged far above in the DTM hierarchy may, especially, result in the failure of many device DTM's.

Figure 2:
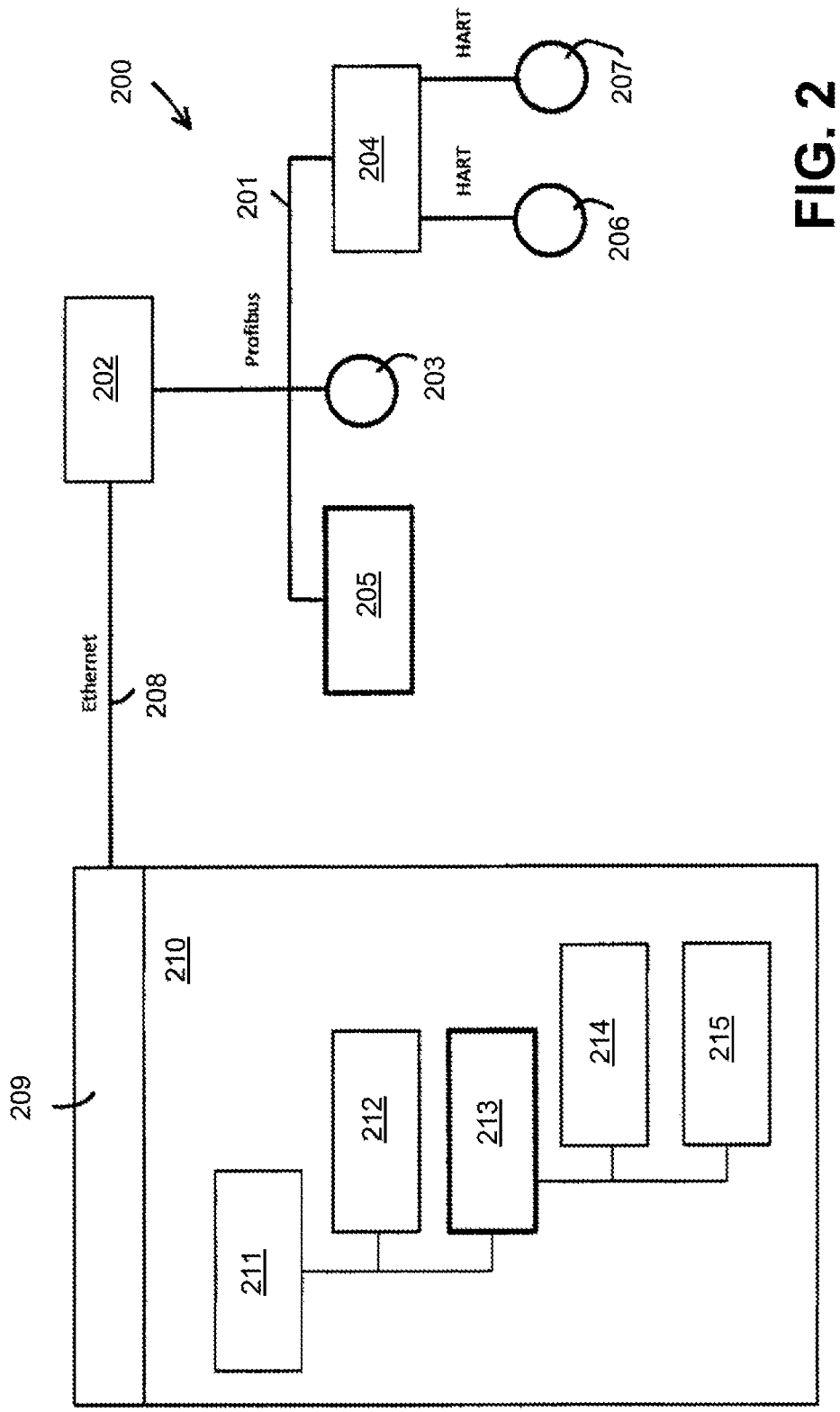
FIG. 2 shows a novel communications structure having a generic communications driver on the part of the device access software and an associated coupler device on the part of the field bus system.

To avoid such disadvantages, a novel topology for the field bus system and the associated device access software is proposed that is illustrated in FIG. 2.

The field bus system 200 shown in FIG. 2 comprises a Profibus segment 201 having a field access device 202, a field device 203, as well as a gateway 204. Additionally connected to the Profibus segment 201 is a coupler device 205 that is provided for the coupling and decoupling of acyclical data traffic. Connected to the gateway 204 are the two field devices 206, 207 that communicate with the gateway 204 via the HART protocol. The gateway 204 is designed to convert Profibus data packets received from the Profibus segment 201 into corresponding HART data packets, and vice versa.

In the example of a field bus topology that is shown in FIG. 2, the two field bus protocols Profibus and HART are used. This is to be understood only as an example. Other field bus protocols might also be used, as well as interconnected field bus topologies having a plurality of different field bus segments and field bus protocols.

A host 209 on which device access software 210 is installed is connected to the field access device 202 via an Ethernet connection 208. The various components of the field bus system 200 may be accessed via the device access software 210. A parameterization, configuration, and state monitoring of the various components of the field bus system 200 may, especially, be performed via the device access software 210.

In the example shown in FIG. 2, the device access software 210 is an FDT framework application into which a number of different DTM's are integrated. The communications DTM 211 is located at the uppermost position of the DTM hierarchy. In the hierarchy level below the communications DTM 211, a gateway DTM 212 is arranged that is associated with the field device 203. Moreover, a generic communications driver 213 that is associated with the newly-added coupler device 205 is arranged in the hierarchy level below the communications DTM 211. Via the generic communications driver 213, a data connection to the coupler device 205 may be established, which may be used to supply suitably-formatted data traffic for access to different components into the field bus system 200, and, in the reverse direction, to transmit data traffic from these components to the generic communications driver 213.

In the example shown in FIG. 2, the FDT standard is used for the framework application, wherein the drivers correspond to the DTM standard. However, instead of this, other standards, e.g., DD, EDD, EDS, FDI Device Packages, or other standards, could also be used for the device access software and the drivers or device description files integrated therein.

In the hierarchy level below the generic communications driver 213, two device DTM's 214, 215 are arranged that are associated with the two field devices 206, 207. No associated gateway DTM is provided for the gateway 204. The functionality that was provided by the gateway DTM 112 in the solution shown in FIG. 1 is now taken over by the generic communications driver 213, together with the coupler device 205.

The two field devices 206, 207 are HART field devices. In this respect, the two associated device DTM's 214, 215 are also designed for the HART protocol. The data exchange between the device DTM's 214, 215 and the generic communications driver 213 therefore takes place according to the HART protocol. The generic communications driver 213 is designed to convert the HART data packets received from the device DTM's 214, 215 into corresponding Profibus data packets, and to transmit these Profibus data packets to the coupler device 205 via the Ethernet connection 208. The coupler device 205 thus receives Profibus data packets with HART data wrapped therein from the generic communications driver 213, which HART data are intended for the field devices 206, 207. For the coupler device 205, the aim is now set of transmitting these data to the field devices 206, 207 in a suitable data format. For this, the coupler device 205 uses information about the topology of the field bus system 200, which is obtained via analysis of the data traffic in the Profibus segment 201. Using this topology information, starting from the primary data traffic that it has received from the generic communications driver 213, the coupler device 205 generates secondary data traffic, with the addition of suitable routing information, which secondary data traffic is fed into the Profibus segment 201. The Profibus packets that are generated by the coupler device 205 are converted by the gateway 204 into corresponding HART data packets, and these HART data packets are then routed to those of the field devices 206, 207 for which they are intended.

In the reverse direction, HART data packets that are generated by the field device 206, for example, are converted by the gateway 204 into corresponding Profibus data packets, which are then received by the coupler device 205. From these data received from the field device 206, the coupler device 205 generates corresponding primary data traffic that is transmitted via the Ethernet connection 208 to the generic communications driver 213. There, the Profibus data packets are converted into corresponding HART data packets and routed to the device DTM 214, which is associated with the field device 206.

In the solution shown in FIG. 2, a bi-directional data connection is established between a generic communications driver 213 that is integrated into the FDT framework application and a coupler device 205 that is a component of the field bus system 200. All field devices that are arranged on the same hierarchy level as the coupler device 205, or in hierarchy levels below the coupler device 205 (thus, the field devices 206, 207 in FIG. 2), may be accessed via the coupler device 205. In the DTM hierarchy, the corresponding device DTM's 214, 215 for these field devices 206, 207 are instantiated directly below the generic communications driver 213. A gateway DTM for the gateway 204 may thereby be omitted. The coupler device 205 is then responsible for converting the primary data traffic received from the generic communications driver 213, with addition of suitable routing information, into secondary data traffic, and for sending these to the Profibus segment 201. This secondary data traffic is then supplied from the gateway 204 to those of the field devices 206, 207 for which the data are designated.

The basic concept of the arrangement shown in FIG. 2 is to introduce two central components, viz., a generic communications driver 213 on the device access software 210 side and a coupler device 205 integrated into the field bus system 200, instead of the hierarchical DTM structure shown in FIG. 1, in order to establish bi-directional primary data traffic between these central components. The topology of the field bus system 200 is known on the coupler device 205 side, such that the data received from the device access software 210 may be routed to the respective destination, with the addition of suitable routing information.

How the communications structure shown in FIG. 2 is set up in sequence is depicted in FIGS. 3A through 3E. The same reference characters as in FIG. 2 are there used for the individual components.

Figure 3A:
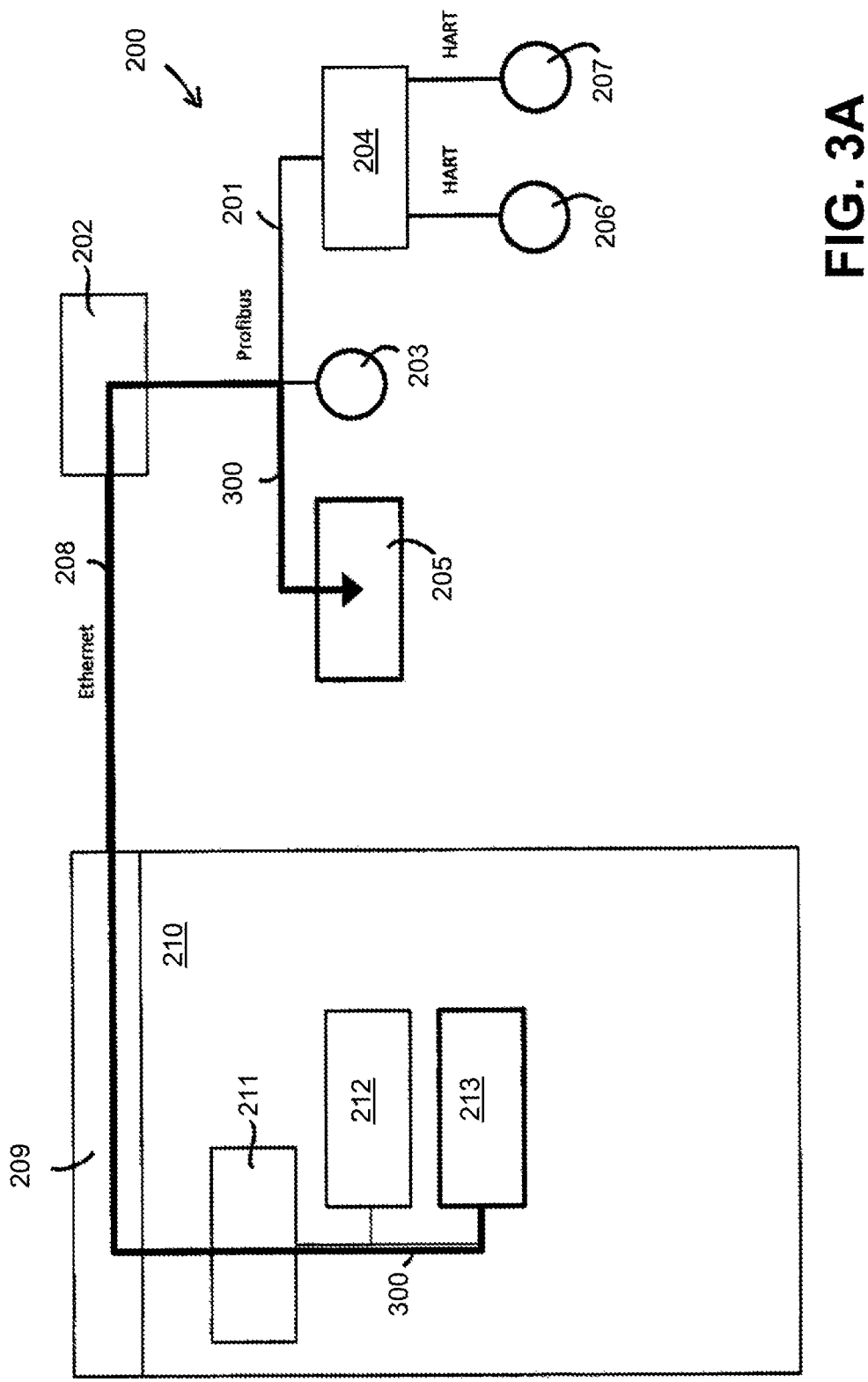
FIG. 3A shows a query that is directed from the generic communications driver to the coupler device.

The field bus system 200 is recognizable in FIG. 3A. The coupler device 205 is connected to the Profibus segment 201. Moreover, the host 209 with the device access software 210 installed thereon is recognizable in FIG. 3A. The device access software 210 initially comprises only the communications DTM 211, the device DTM 212 for the field device 203, and the generic communications driver 213 that is associated with the coupler device 205. Beyond these, additional device DTM's are not yet installed.

As soon as the coupler device 205 is incorporated into the field bus system 200, the coupler device 205 begins with the scanning of the topology of the field bus system 200. The coupler device 205 analyzes the Profibus data packets transferred to the Profibus segment 201 and determines the topology of the field bus system 200 using device identifiers, manufacturer identifiers, device versions, and addressing and routing information. In this way, the coupler device 205 generates a list of the field devices and gateways present.

On the generic communications driver 213 side, it is not yet known what field devices and gateways are present in the field bus system 200. As shown in FIG. 3A, the generic communications driver 213 therefore sends a query to the coupler device 205 in order to query information about the identified field devices and gateways. This query is drawn as arrow 300 in FIG. 3A.

Figure 3B:
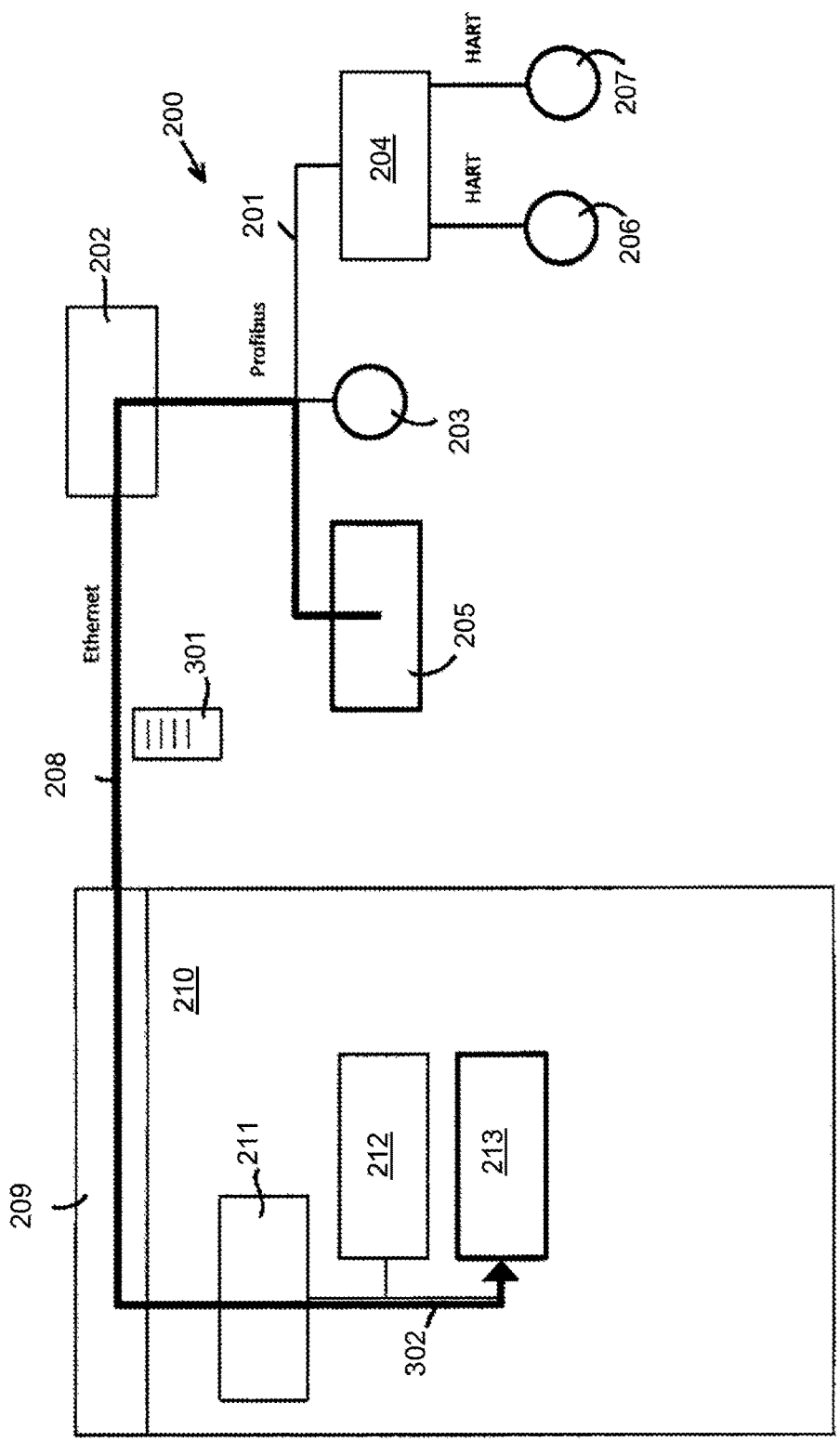
FIG. 3B shows the transmission of a list of all field devices from the coupler device to the generic communications driver.

How the coupler device 205 transmits a list 301 of field devices and gateways to the generic communications driver 213 in response to this query is shown in FIG. 3B. The transmission of the list 301 from the coupler device 205 to the generic communications driver 213 is depicted by the arrow 302 in FIG. 3B. The list 301 includes information about the field devices and gateways present in the field bus system, as well as about the protocols used by these devices. As of this point, this list 301 is also available to the generic communications driver 213.

Figure 3C:
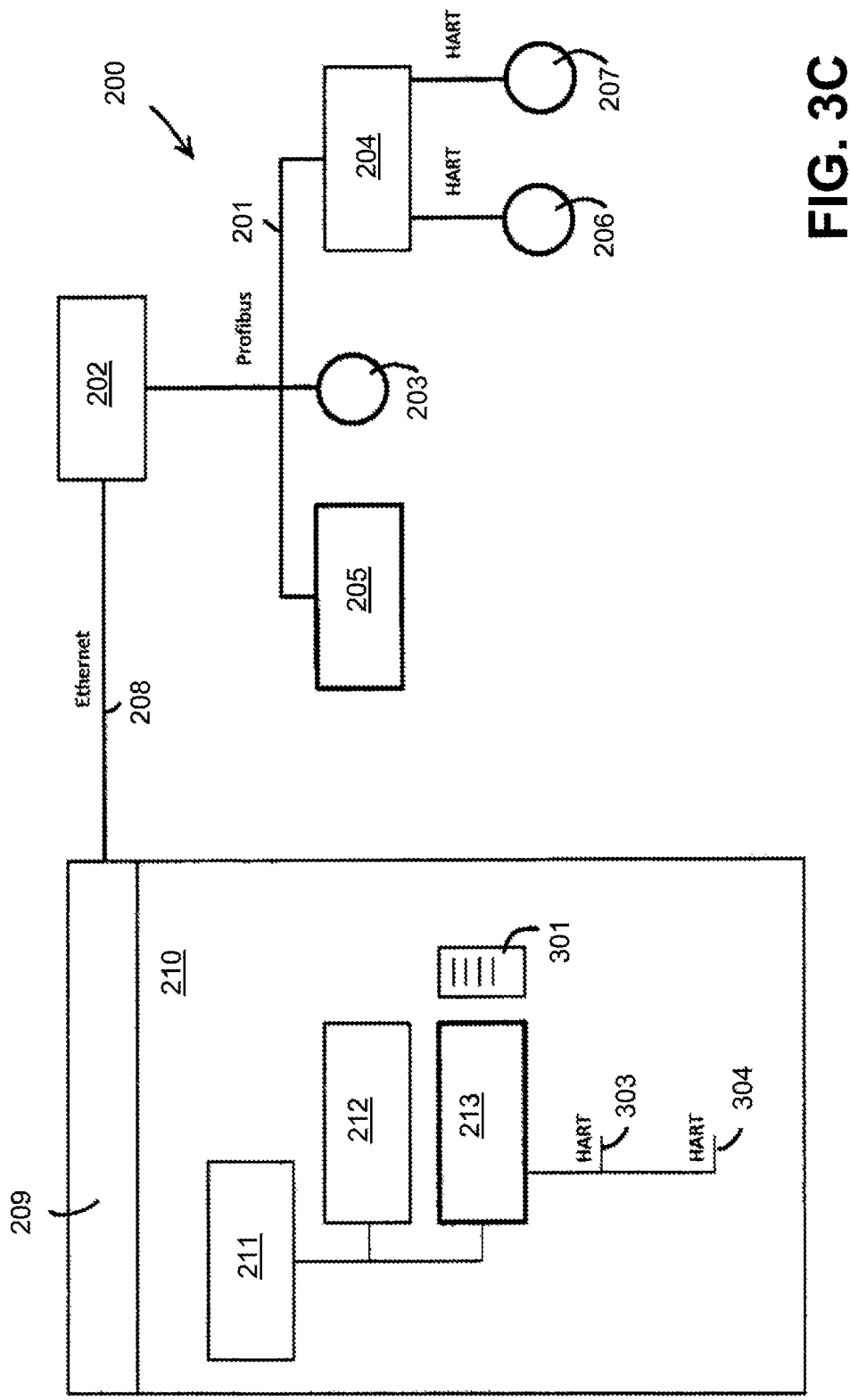
FIG. 3C shows the establishment of suitable communications channels for the device DTM's on the part of the generic communications driver.

In the next step, which is shown in FIG. 3C, the generic communications driver 213 establishes an associated communications channel for each field device listed in the list 301. In the example depicted in FIGS. 3A through 3E, the generic communications driver 213 thus establishes two HART channels 303, 304, wherein the HART channel 303 is provided for the field device 206 and wherein the HART channel 304 is provided for the field device 207. The communications channels 303, 304 are thus respectively established to match the protocols used by the field devices 206, 207.

Figure 3D:
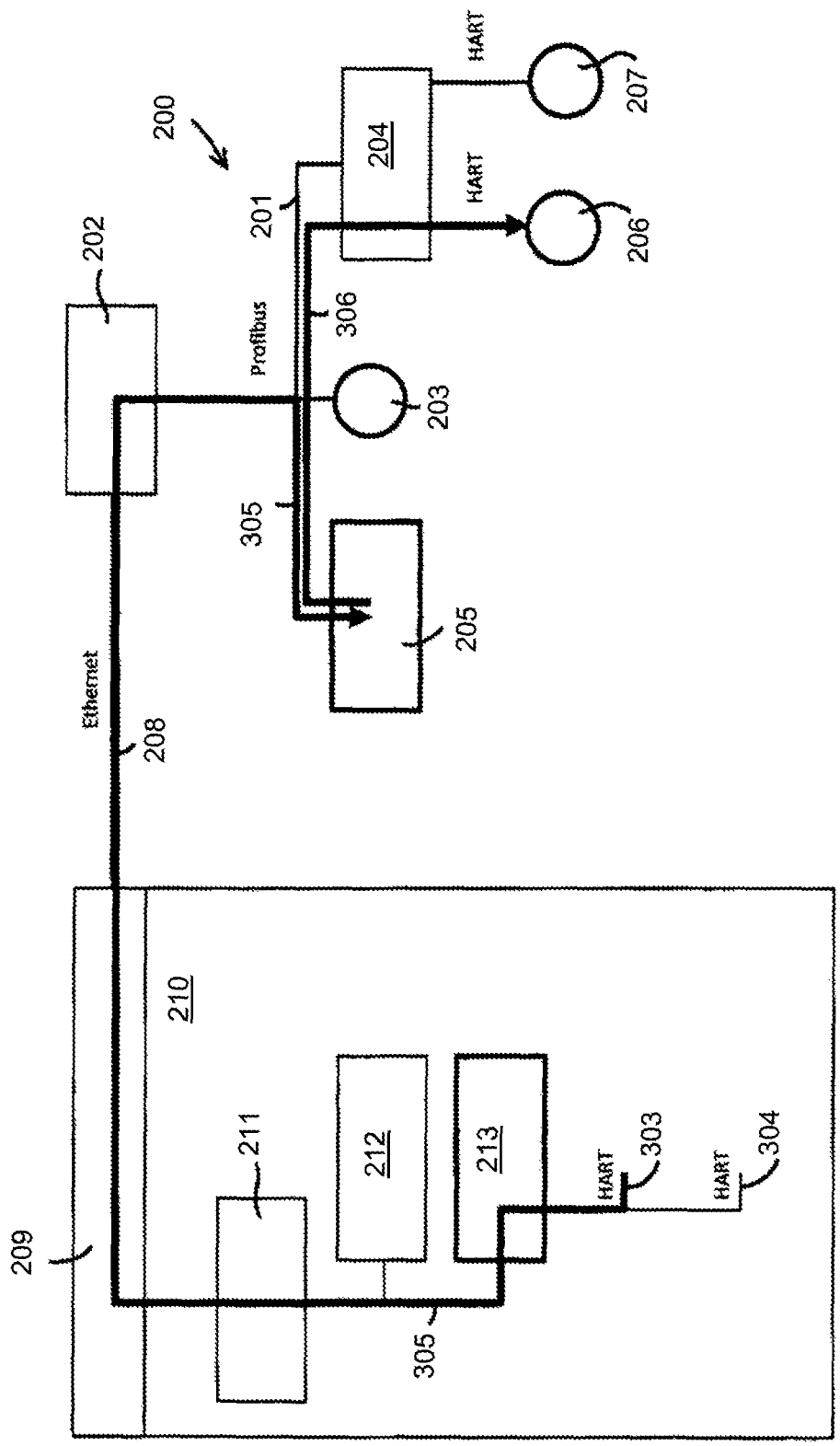
FIG. 3D shows the performance of an FDT scan for each of the established communications channels.

In the next step, which is illustrated in FIG. 3D, what is known as an FDT scan is performed from each of the newly established communications channels 303, 304. With the aid of an FDT scan, information about the associated field device may be queried from a specific communications channel. In particular, the device type, the version, the device identifier, and the manufacturer identifier of the associated field device may be determined with the aid of an FDT scan.

An FDT scan initiated by the FDT framework application for the communications channel 303 is shown as an example in FIG. 3D. According to the arrow 305, the scan query is transmitted via the generic communications driver 213 to the coupler device 205. According to the arrow 306, the coupler device 205 relays the scan query, with the addition of suitable routing information, to the field device 206 whose data should be queried.

The field device 206 thereupon transmits information regarding its own device type and regarding the version, as well as its own device identifier and manufacturer identifier, to the coupler device 205. The coupler device 205 relays this information to the generic communications driver 213. The FDT framework application thereby now knows what type of field device belongs to the communications channel 303.

For the second communications channel 304, a second FDT scan is initiated by the FDT framework application in order to query information about the associated field device 207. For reasons of clarity, this second FDT scan is not sketched in FIG. 3D. The field device 207 thereupon transmits the requested information to the generic communications driver 213. The FDT framework application now knows the respective device type, the version, the device identifier, and the manufacturer identifier of both field devices 206, 207.

Figure 3E:
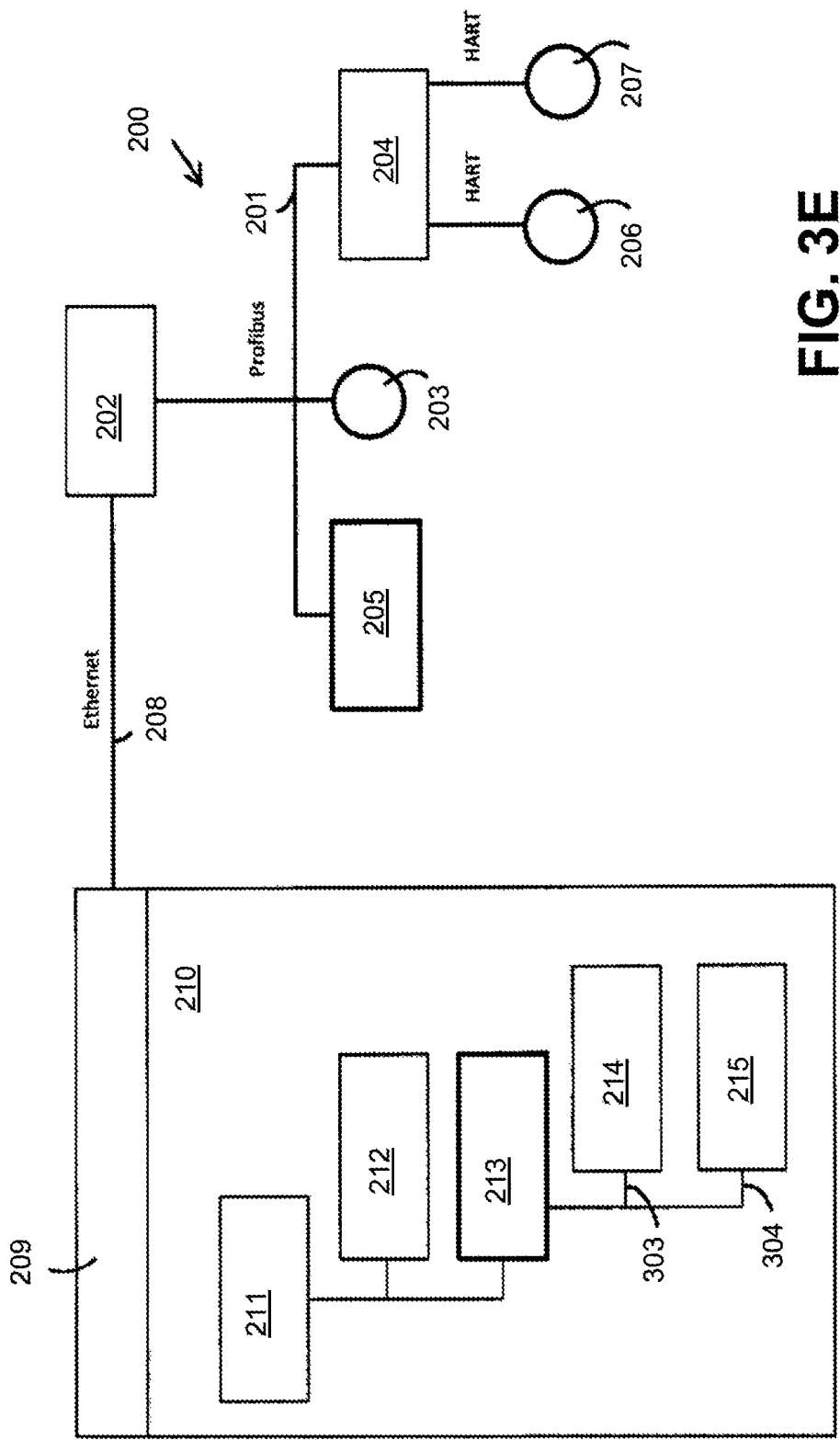
FIG. 3E shows the instantiation of suitable device DTM's for the field devices.

As is shown in FIG. 3E, in the next step, the device DTM's 214, 215 matching the field devices 206, 207 are instantiated for each of the two communications channels 303, 304. After instantiation has taken place, the field device 206 may be accessed via the device DTM 214, the communications channel 303, and the generic communications driver 213. Accordingly, the field device 207 may be accessed via the device DTM 215, the communications channel 304, and the generic communications driver 213. The instantiation of the communications structure shown in FIG. 2 is concluded with the instantiation of the two device DTM's 214, 215.

Figure 4:
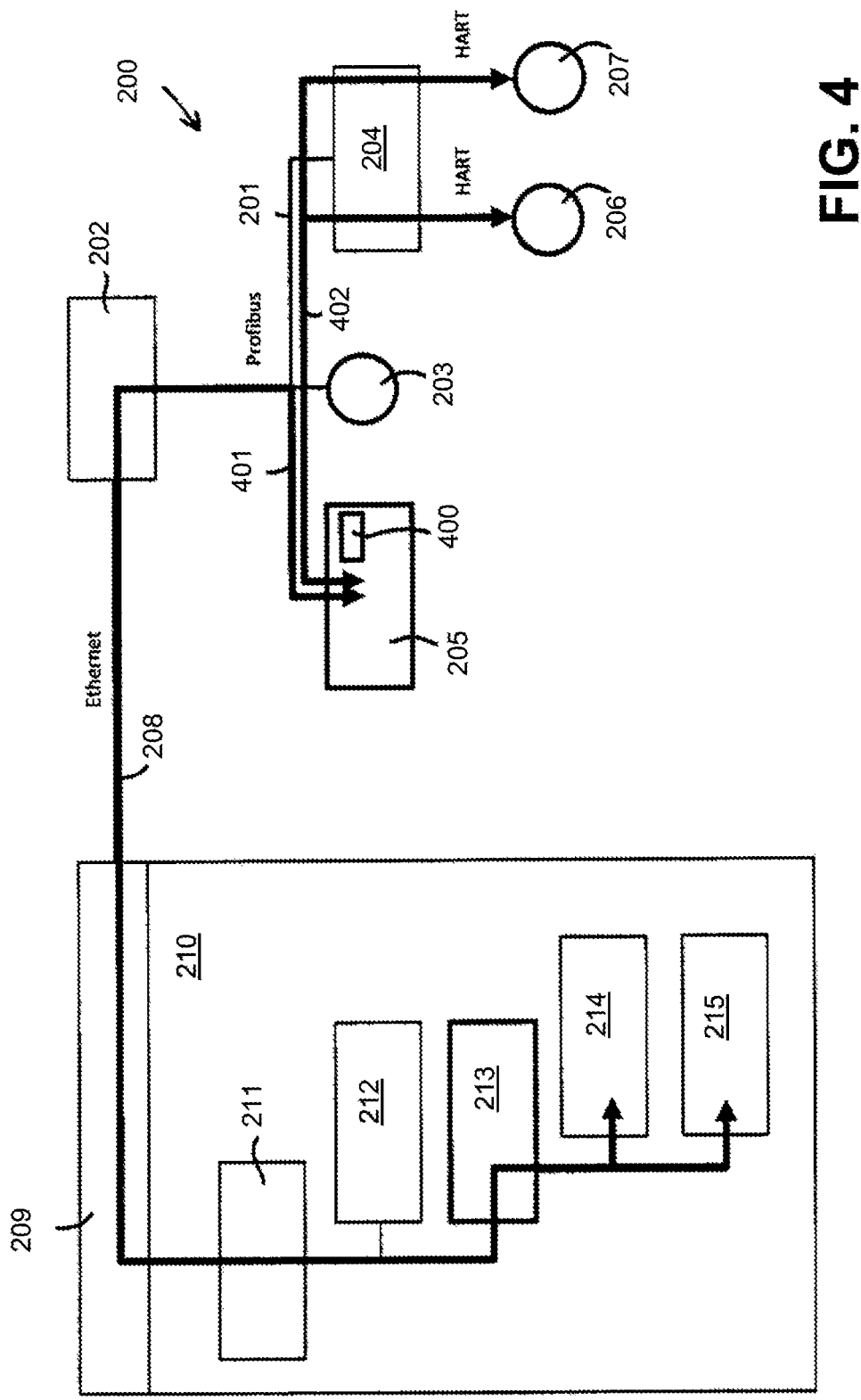
FIG. 4 shows the workflow of the communications between the device DTM's and the field devices.

The data flow in a communications structure established corresponding to FIG. 3A through FIG. 3E is depicted in an overview in FIG. 4.

Parameters of the associated field device 206 are initially to be accessed from the device DTM 214. For this, the device DTM 214 sends a HART data packet to the generic communications driver 213, which receives this HART data packet via the communications channel 303 and converts it into a corresponding Profibus data packet. This Profibus data packet is converted by the communications DTM 211 into a corresponding Ethernet data stream and is transmitted via the Ethernet connection 208 to the field access device 202. There, the Ethernet data are converted back again into the original Profibus data packet. This Profibus data packet is sent to the Profibus segment 201 and transmitted to the coupler device 205.

The required topology information for the additional routing of this data packet is available on the coupler device 205 side. With the aid of this topology information, the coupler device 205 may establish a transmission path for the transmission of the data packet to the desired destination (thus, to the field device 206). On the coupler device 205 side, it is, especially, known that the data packet may be routed via the gateway 204 to the field device 206, and what routing information is required by the gateway 204 in order to route the data packet to the field device 206. For the most prevalent gateways in the field of automation technology, information regarding the required data formats is stored on the coupler device 205 side. To convert the data packets, the coupler device 205 comprises a data format converter 400 that converts the primary data traffic 401 received from the generic communications driver 213 into a corresponding secondary data traffic 402, and thereby inserts the routing information required by the gateway 204 into the Profibus packets. The secondary data traffic 402 is routed to the gateway 204, which converts the Profibus data packets of the secondary data traffic 402 into corresponding HART data packets and routes these HART data packets to the field device 206.

It is now to be assumed that the field device 206 answers the query of the device DTM 214 and, for example, transmits one or more parameter values. For this, the field device 206 sends a HART data packet with the parameter values to the gateway 204, which converts this HART data packet into a corresponding Profibus data packet. The coupler device 205 receives this Profibus data packet of the secondary data traffic 402 and converts it into a Profibus data packet of the primary data traffic 401 by means of the data format converter 400. The primary data traffic 401 is then transferred via the field access device 202, the Ethernet connection 208, and the communications DTM 211 to the generic communications driver 213. The generic communications driver 213 converts the received Profibus data packet to a corresponding HART data packet and transmits this HART data packet via the communications channel 303 to the device DTM 214.

The necessary parameter values of the field device 206 are therefore now available on the device DRM 214 side. These parameter values may be displayed by the device DTM 214—for example, on a graphical user interface.

The data format converter 400 is designed to convert the primary data traffic 401 into the secondary data traffic 402, and to thereby insert suitable routing information for the gateway 204 (or also for other gateways). This data format converter 400 is integrated into the coupler device 205 in FIG. 4. This is an advantageous solution, because the required topology information may simply be supplied on the coupler device 205 side by reading the data traffic.

Figure 5:
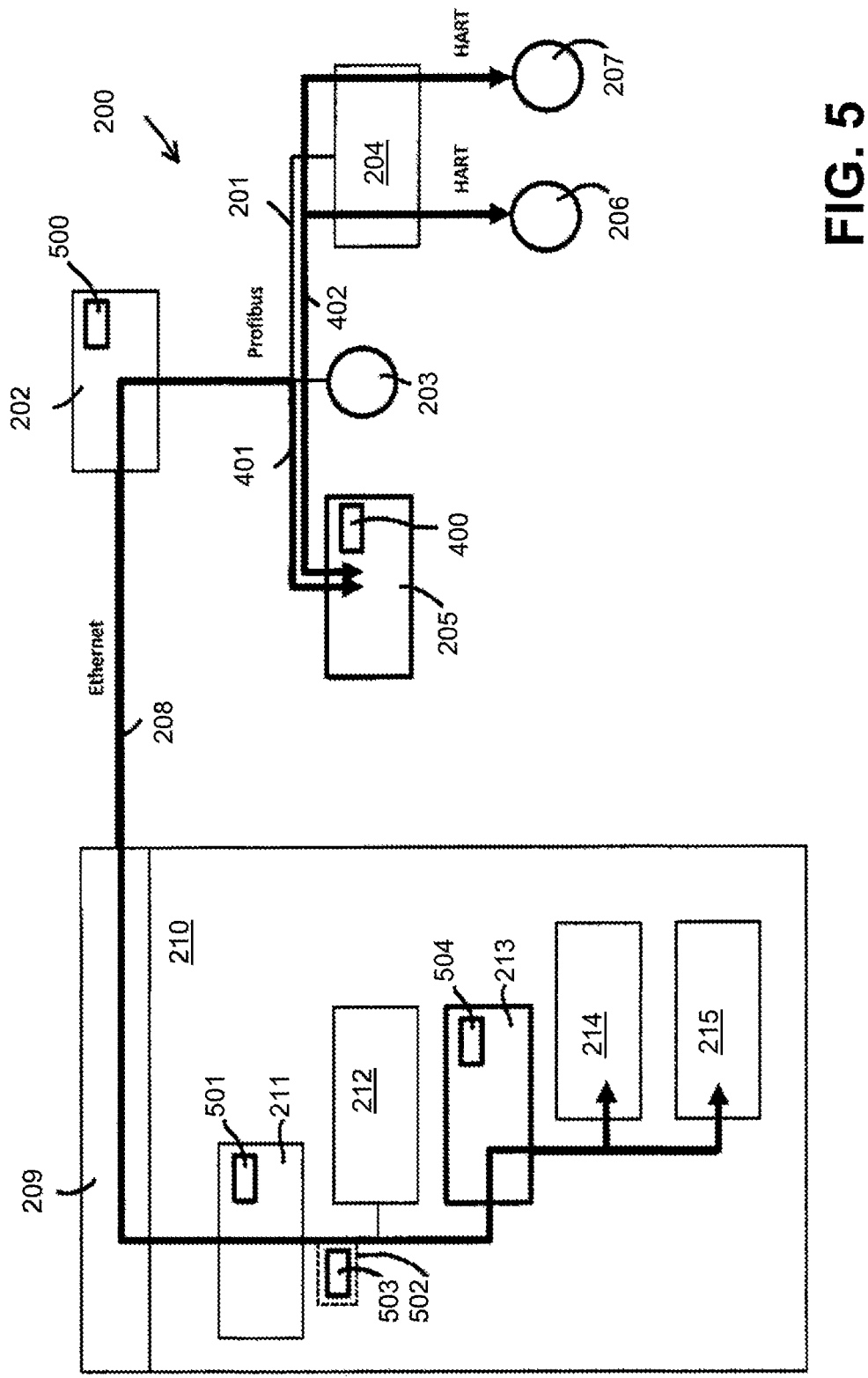
FIG. 5 shows various possibilities for implementation of a data format converter for converting the primary data traffic into secondary data traffic.

As is depicted in FIG. 5, the data format converter may be placed at a distance from the coupler device 205 and moved toward other components of the communications structure. For example, instead of the data format converter 400, a data format converter 500 could be provided on the field access device 202 side. In this instance, the conversion of the primary data traffic into the secondary data traffic would, with the addition of the required routing information, already take place at the field access device 202 side. The topology information required for the format conversion may also be detected by the field access device 202 by reading the data traffic at the Profibus segment 201.

An additional possibility is to realize the data format converter as software, and to integrate it into the device access software 210 on the host 209 side. For example, the data format converter 501 for the conversion of the data packets and the addition of the required routing information might be integrated into the communications DTM 211. In this instance, the communications DTM 211 would be responsible for converting the primary data traffic into the secondary data traffic. In order to be able to insert the routing information required for this, however, the communications DTM 211 would require topology information from the field bus system 200 which, for example, would need to be transferred in advance from the field bus system 200 to the communications DTM 211 in the form of an expanded list. However, the sending of such a list supplemented with topology information would be possible without problems. So that the communications DTM 211 may generate matching routing information for the data packets, information regarding the data formats of the most prevalent gateways would, moreover, need to be stored on the communications DTM 211 side. The communications DTM 211 would then generate the secondary data traffic and, via the Ethernet connection 208, transmit pre-assembled data packets provided with routing information to the field access device 202, which then sends these data packets to the Profibus segment 201.

As an additional alternative, a separate software module 502 that comprises a data format converter 503 may be provided on the device access software 210 side, below the communications DTM 211. This software module 502 would then be designed to convert the primary data traffic received from the generic communications driver 213 into the corresponding secondary data traffic, wherein the necessary routing information are inserted. This secondary data traffic would then be transmitted via the communications DTM 211 and the Ethernet connection 208 to the field access device 202, which then sends this secondary data traffic to the Profibus segment 201.

As an additional alternative, it would also be conceivable to integrate the data format converter 504 into the generic communications driver 213. In this instance, the conversion from primary data traffic into the secondary data traffic supplemented with routing information would already take place at the generic communications driver 213 side. A requirement for this would in turn be that topology information be provided in advance from the field bus system 200 to the generic communications driver 213 via the field bus system 200. The generic communications driver 213 would then transmit the fully-assembled secondary data traffic provided with routing information to the field access device 202 via the communications DTM 211 and the Ethernet connection 208, and the field access device 202 would send this secondary data traffic to the Profibus segment 201.

In the previously discussed example, in the device hierarchy of the field bus system, the coupler device was arranged somewhere between the field access device and the field devices. In this solution, the coupler device was responsible only for the routing within a specific sub-region of the field bus system. The coupler device may therefore be designed to be relatively small and requires only a small amount of computing capacity.

Figure 6:
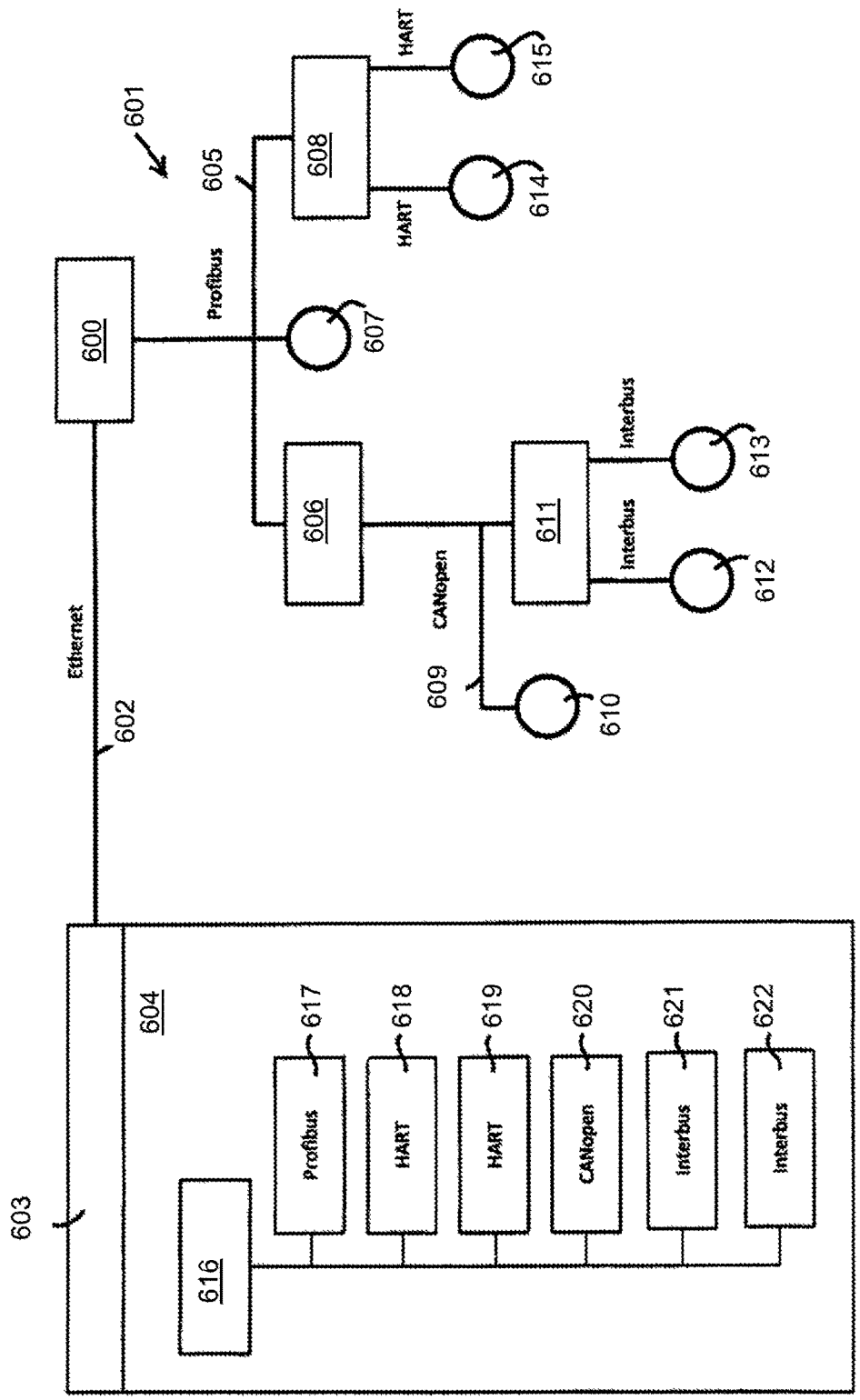
FIG. 6 shows a field bus system in which the coupler device is simultaneously designed as a field access device.

In FIG. 6, an additional example is shown in which a coupler device 600 is arranged at the uppermost location of the device hierarchy of the field bus system 601. In the example shown in FIG. 6, the coupler device 600 is therefore responsible for the entire routing in the comparatively complex field bus system 601.

The coupler device 600 is connected to a host 603 via an Ethernet connection 602. Device access software 604 is installed on the host 603. For the purpose of parameterization, configuration, and state monitoring, the components of the field bus system 601 may be accessed from the device access software 604. The coupler device 600 thus simultaneously serves as a field access device. This has the advantage that the coupler device 600 may monitor the entire data traffic that is supplied into the field bus system 601. For example, arriving data packets may be subjected to a security check in order to detect harmful software. Moreover, when accessing the field bus system 601, the access authority and authorization for this access may be checked—for example, with the aid of various user accounts.

The field bus system 601 comprises a Profibus segment 605 to which are connected the coupler device 600, a first gateway 606 (manufacturer X), a Profibus field device 607, and a second gateway 608 (manufacturer Y).

The first gateway 606 is designed to convert the Profibus protocol into the CANopen protocol. A CANopen field device 610, as well as a third gateway 611 (manufacturer Z), are connected to the CANopen segment 609. This third gateway 611 is designed to convert the CANopen protocol into the Interbus protocol. Two Interbus field devices are connected to the third gateway 611 (manufacturer Z), viz., the Interbus field device 612 and the Interbus field device 613.

The second gateway 608 (manufacturer Y) is designed to convert the Profibus protocol into the HART protocol. Two HART field devices are connected to the second gateway 608 (manufacturer Y), viz., the HART field device 614 and the HART field device 615.

To detect the topology of the field bus system 601, a topology scan is performed from the coupler device 600. The coupler device thereby first detects the following components:

first gateway 606 (manufacturer X),
Profibus field device 607,
second gateway 608 (manufacturer Y).

It is to be assumed that the coupler device 600 supports both the first gateway 606 (manufacturer X) and the second gateway 608 (manufacturer Y). Therefore, the coupler device 600 requests from second gateway 608 additional information about what additional field devices and components are connected to the second gateway 608. The second gateway 608 (manufacturer Y) responds that two HART field devices 614 and 615 are connected to the second gateway 608.

The coupler device 600, moreover, requests from first gateway 606 (manufacturer X) information about what field devices and components are connected to the first gateway 606. The first gateway 606 responds that a CANopen field device 610, as well as a third gateway 611 (manufacturer Z), are connected to the first gateway 606.

Because the third gateway 611 (manufacturer Z) is likewise supported by the coupler device 600, the coupler device 600 requests from the third gateway 611 information about what additional field devices and components are connected to the third gateway 611. The third gateway 611 responds that two Interbus field devices 612 and 613 are connected to the third gateway 611.

The coupler device 600 has now performed a complete topology scan of the field bus system 601. The following six field devices have thereby been discovered:
1) Profibus field device 607
   Routing: Profibus→Profibus field device 607
2) HART field device 614
   Routing: Profibus→second gateway 608→HART field device 614
3) HART field device 615
   Routing: Profibus→second gateway 608→HART field device 615
4) CANopen field device 610
   Routing: Profibus→first gateway 606→CANopen field device 610
5) Interbus field device 612
   Routing: Profibus→first gateway 606→third gateway 611→Interbus field device 612
6) Interbus field device 613
   Routing: Profibus→first gateway 606→third gateway 611→Interbus field device 613

On the coupler device 600 side, a complete list of all field devices present in the field bus system 601, as well as the associated routing information, is now available.

Initially, only the generic communications driver 616 that is associated with the coupler device 600 is installed on the device access software 604 side (thus, the FDT framework application). The generic communications driver 616 initially requests from the coupler device 600 a list of the field devices present on the field bus system 601 side. As depicted above, the coupler device 600 has already determined the list of field devices, as well as the associated routing information, by means of a topology scan. The coupler device 600 therefore transmits a list with the following six field devices to the generic communications driver 616:
   Profibus field device 607
   HART field device 614
   HART field device 615
   CANopen field device 610
   Interbus field device 612
   Interbus field device 613

After receiving this list, the generic communications driver 616 establishes, in total, six communications channels for these field devices, viz., one Profibus communications channel, two HART communications channels, one CANopen communications channel, and two Interbus communications channels.

An FDT scan is thereupon performed for each of these communications channels, and respective matching device DTM's for the various field devices of the field bus system 601 are thereupon instantiated. A suitable device DTM 617 for Profibus is, especially, instantiated for the Profibus field device 607. Respective matching device DTM's 618, 619 for HART are instantiated for the two HART field devices 614 and 615. A matching device DTM 620 for CANopen is instantiated for the CANopen field device 610. Respective matching device DTM's 621, 622 for Interbus are instantiated for the two Interbus field devices 612 and 613.

After the instantiation of the six device DTM's 617 through 622, the communications structure is complete. The individual device DTM's 617 through 622 may now send respective data packets to the coupler device 600 via the generic communications driver 616 and the Ethernet connection 602. There, the data packets of the primary data traffic are converted into the secondary data traffic, wherein routing information is inserted with which the data packets are routed to the destination field device.

In the reverse direction, the field devices may transmit data packets to the coupler device 600, and these data packets are then transmitted via the Ethernet connection 602 to the generic communications driver 616. This converts the data packets into the protocol required for the respective device DTM and relays the data packets to the respective device DTM.

The invention claimed is:

1. A data transmission system for a data exchange between a field bus system including at least one field device and a device access software installed on a host and with which components of the field bus system may be accessed, the data transmission system comprising:
   a coupler device connected to the field bus system;
   a generic communications driver integrated into the device access software;
   at least one device driver integrated into the device access software; and
   a central data transmission route disposed between the generic communications driver and the coupler device and configured to transfer primary data traffic,
   wherein the generic communications driver is configured to exchange data with the at least one device driver and to transmit data received from the at least one device driver to the coupler device as part of the primary data traffic via the central data transmission route and to relay data within the primary data traffic received from the coupler device via the central data transmission route to the at least one device driver for which the data are intended,
   wherein the generic communications driver is further configured to convert the primary data traffic received from the coupler device into a field bus protocol matching the at least one device driver and to relay the converted primary data traffic to the at least one device driver and wherein the generic communications driver includes at least one communications channel for a data exchange with the at least one device driver, and
   wherein the coupler device is configured to convert the primary data traffic received from the generic communications driver via the central data transmission route by the addition of routing information into secondary data traffic and to send the secondary data traffic to the field bus system and to convert data received from the at least one field device into the primary data traffic and to transmit the primary data traffic via the central data transmission route to the generic communications driver.

2. The data transmission system of claim 1, wherein the routing information is configured for routing the secondary data traffic to a respective destination within the field bus system and the coupler device is further configured to transfer the secondary data traffic to the respective destination within the field bus system using the routing information.

3. The data transmission system of claim 2, wherein the coupler device is further configured to convert the primary data traffic having a first data format into the secondary data traffic having a second data format suitable for routing to the respective destination, and wherein the coupler device is further configured to convert secondary data traffic received from the at least one field device having the second data format into primary data traffic having the first data format and to transmit the primary data traffic to the generic communications driver via the central data transmission route.

4. The data transmission system of claim 2, wherein the coupler device is further configured to acquire a topology of the field bus system and of the at least one field device via an analysis of the secondary data traffic on the field bus and to generate the routing information for the secondary data traffic from the coupler device to the respective destination using the topology.

5. The data transmission system of claim 2, wherein the field bus system further includes at least one gateway, and wherein the coupler device is further configured to determine via which at least one gateway the secondary data traffic should be routed on a data transmission path from the coupler device to the respective destination within the field bus system, to generate suitable routing information, and to insert the routing information required by the at least one gateway into data packets of the secondary data traffic.

6. The data transmission system of claim 1, wherein the device access software supports the Field Device Tool ("FDT") standard, and one or more Device Type Managers ("DTMs"), gateway DTMs, and communications DTMs are integrated into the device access software,
wherein the device access software supports the Field Device Integration ("FDI") standard, and device drivers or device description files in the form of FDI Device Packages are integrated into the device access software,
wherein the device access software supports the Device Description ("DD") standard, and device drivers or device description files of the DD standard are integrated into the device access software,
wherein the device access software supports the Electronic Device Description ("EDD") standard, and device drivers or device description files of the EDD standard are integrated into the device access software, or
wherein the device access software supports the Electronic Data Sheet ("EDS") standard, and device drivers or device description files of the EDS standard are integrated into the device access software.

7. The data transmission system in of claim 1, wherein the coupler device is arranged at a highest level of a hierarchy of the field bus system, the coupler device is embodied as a field access device, and the coupler device is configured to perform a security review of the primary data traffic and to review access authorizations for accesses to components of the field bus system.

8. The data transmission system of claim 1, wherein the coupler device is arranged at a hierarchy level below a highest level of a hierarchy of the field bus system, and the coupler device is configured to route data only in a sub-segment of the field bus system.

9. A method for data exchange between a field bus system and device access software installed on a host, comprising:
providing a field bus system including at least one field device and a coupler device connected to the field bus system;
providing a device access software including a generic communications driver integrated into device access software and at least one device driver integrated into the device access software, wherein the at least one device driver is associated with a field device of the field bus system and wherein the generic communications driver includes at least one communication channel for a data exchange with the at least one device driver;
providing a central data transmission route between the coupler device and the generic communications driver configured to transfer primary data traffic between the coupler device and the generic communications driver;
exchanging data between the generic communications driver and the at least one device driver;
exchanging data as a part of the primary data traffic via the central data transmission route between the generic communications driver and the coupler device;
converting the primary data traffic received by the coupler device from the generic communications driver with the addition of routing information into secondary data traffic;
sending the secondary data traffic to the field bus system;
converting the data received from the at least one field device into primary data traffic;
sending the primary data traffic to the generic communications driver via the central data transmission route; and
converting the primary data traffic received from the coupler device via the central data transmission route into a field bus protocol matching the at least once device driver and relaying the converted primary data traffic to the at least one device driver.

10. The method of claim 9, further comprising:
transmitting data from the at least one device driver to the generic communications driver;
transmitting the data received from the at least one device driver as part of the primary data traffic from the generic communications driver to the coupler device via the central data transmission route;
converting the primary data traffic received by the coupler device from the generic communications driver by an addition of routing information into secondary data traffic; and
sending the secondary data traffic to the field bus system.

11. The method of claim 10, further comprising:
transmitting data from the at least one field device to the coupler device;
transmitting the data received from the at least one field device as part of the primary data traffic from the coupler device to the generic communications driver via the central data transmission route; and
relaying the data received from the coupler device from the generic communications driver to that the at least one device driver for which the data are intended.

* * * * *